(12) United States Patent
Shelef et al.

(10) Patent No.: US 8,852,048 B2
(45) Date of Patent: Oct. 7, 2014

(54) PLANETARY HARMONIC DIFFERENTIAL TRANSMISSION

(76) Inventors: Ben Shelef, Cupertino, CA (US);
Shmuel Erez, San Jose, CA (US)

(*) Notice: Subject to any disclaimer, the term of this patent is extended or adjusted under 35 U.S.C. 154(b) by 350 days.

(21) Appl. No.: 13/214,154

(22) Filed: Aug. 19, 2011

(65) Prior Publication Data

US 2012/0046140 A1 Feb. 23, 2012

Related U.S. Application Data

(60) Provisional application No. 61/375,036, filed on Aug. 19, 2010.

(51) Int. Cl.
*F16H 57/08* (2006.01)
*F16H 49/00* (2006.01)
*F16H 25/06* (2006.01)

(52) U.S. Cl.
CPC ........ *F16H 49/001* (2013.01); *F16H 2025/066* (2013.01)
USPC .......................................... 475/347; 475/331

(58) Field of Classification Search
USPC ......... 475/162–164, 167, 180, 331, 344–347; 474/251
See application file for complete search history.

(56) References Cited

U.S. PATENT DOCUMENTS

| | | | | | |
|---|---|---|---|---|---|
| 2,197,014 A | * | 4/1940 | Stenzy | ........................... | 475/182 |
| 3,673,883 A | * | 7/1972 | Adams | ........................... | 474/205 |
| 3,691,871 A | * | 9/1972 | Gladow et al. | ................ | 475/182 |
| 3,842,685 A | * | 10/1974 | Philpott et al. | ................ | 475/107 |
| 5,030,174 A | * | 7/1991 | Eguchi | ........................... | 474/153 |
| 5,462,363 A | * | 10/1995 | Brinkman | ........................ | 384/91 |
| 5,954,611 A | * | 9/1999 | Mills et al. | ..................... | 475/182 |
| 7,086,309 B2 | | 8/2006 | Stoianovici et al. | | |

FOREIGN PATENT DOCUMENTS

DE 3918348 A1 * 12/1990 ............... B23Q 5/00

* cited by examiner

*Primary Examiner* — Justin Holmes
(74) *Attorney, Agent, or Firm* — Nixon Peabody LLP; Joseph Bach, Esq.

(57) ABSTRACT

Described is a planetary harmonic differential transmission, comprised of a rigid externally-toothed inner sprocket, a rigid internally-toothed outer sprocket, a deformable belt that is toothed on both its internal and external faces, and a set of free-rotating planetary sprockets that are mounted on a rotating carrier cage and cause the belt to progressively engage and disengage from successive portions of the rigid sprockets. The input to the transmission is the relative motion between the carrier cage and the inner sprocket, and the output is the relative motion between the outer sprocket and the inner sprocket, resulting in a differential transmission.

21 Claims, 7 Drawing Sheets

PLANETARY HARMONIC DIFFERENTIAL TRANSMISSION

RELATED APPLICATIONS

The present application claims priority benefit from U.S. Provisional Application Ser. No. 61/375,036, filed Aug. 19, 2010, the entire disclosure of which is incorporated herein by reference.

FIELD

The present application is of the field of mechanical power transmissions.

BACKGROUND

Various transmissions are known in the art and are commonly used to transfer motive power received at the input and transferred to the output of the transmission. In general, the power is transmitted from an engine coupled to the input to a live axle coupled to the output. The transmission often converts speed and torque, and may perform an up-conversion or a down-conversion, wherein the output is of higher or lower speed than the input, while the torque is lower or higher than the input, respectively.

The terms "gears", "sprockets" and "transmissions" are sometimes confused in informal use. In this specification, they will be used in the following way:

A gear is a toothed wheel or shaft designed to mesh with other gears for the purpose of transferring rotary motion or power. A sprocket is a toothed wheel designed to mesh with a flexible chain or belt for the purpose of transferring rotary motion of power. A belt is an elongated mechanical elastic element designed to carry force along its length and able to deform due to inherent flexibility of its material. A timing belt is a special elastic belt with a strong, high tensile fiber core band(s) and elastic teeth that can mesh into a sprocket, often used for precision motion and/or synchronization transfer such as in the valve timing mechanism of a car. A chain is an elongated mechanical piece-wise rigid element designed to carry force along its length and able to deform due to hinged connections between its pieces, called links. A transmission is a mechanical assembly comprised of any of gears, sprockets, belts, chains and other elements, whose primary purpose is transferring power between two mechanical interfaces such shafts. A drive is a combination of motor/engine and transmission.

There are several metrics for the evaluation of a transmission:

Efficiency is the measure of the power extracted from the driven (output) interface divided by the power delivered into the input interface. The torque limit is the maximum torque (at a specific interface) the transmission can handle before failure or accelerated wear. Backlash refers to the clearance between mating components, sometimes described as the amount of lost motion due to clearance or slackness when movement is reversed and contact is re-established. It is generally characterized by the amount of free play possible in one interface while the other interface or interfaces are held immobile. Rigidity refers to the ability of the transmission to transfer force without incurring elastic deformation.

Harmonic transmissions use a combination of an externally-toothed inner gear [10] and a slightly larger internally-toothed outer gear [11]. The teeth of the inner gear [10] and outer gear [11] are of similar size. Harmonic transmissions operate by progressively engage successive teeth of the gears to achieve relative motion between them, and are able to withstand particularly high torques with low backlash. Harmonic transmissions often use elasticity to achieve the selective engagement of teeth. In such transmissions, the inner gear [10] is flexible and is deformed by an elliptical wave generator [12] through a flexible ball bearing [13] to progressively engage and disengage successive regions of itself from the rigid outer gear [11]. The design of a long-lived flexible gear is one of the more difficult aspects of such a transmissions. Harmonic transmissions provide large reduction ratios and can transfer large torques.

Planetary transmissions (FIG. 2) use a combination of an externally-toothed inner gear [20], an internally toothed outer gear [21], and a set of small mediating externally-toothed planetary gears [22] which are mounted and can free-spin on a common rotating carrier cage [23]. The cage and inner and outer gears are each connected to a shaft, resulting in a differential transmission. When both the outer and inner gears are of a similar diameter and the planet gears are small in comparison to them, the reduction ratio of a planetary transmission is very limited.

For further related information, the reader should also refer to U.S. Pat. No. 7,086,309, which describes a planetary harmonic motor.

Generally, the requirements of transmission performance is to withstand high moment (torque) in an axial direction and in a direction orthogonal to the axis of rotation, and have high rigidity and no backlash. For example, in a pair of gears, backlash is the amount of clearance between mated gear teeth. The backlash requirements may depends on allowance for lubrication, manufacturing errors, deflection under load, thermal expansion, and costs. When the specification of the transmission require high torque, high rigidity and no or minimal backlash, it leads to tight tolerances on the fabrication of the toothed wheels and the bearing supporting the rotating parts of the transmission. This, of course, increases the cost of the transmission. Therefore, what is needed is a transmission that provides high performance in terms of torque, rigidity and backlash, but that can be produced with lower tolerances and thus lower cost.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the subject invention provide transmissions that have high performance in terms of torque, rigidity and backlash, but they can be produced with lower tolerances and lower costs.

Embodiments of the inventive transmission have no metal-to-metal or Hertzian contact, and so are immune to the wear that is inherent to meshing gear mechanisms, and the resultant collateral damage caused by worn metal particulates.

In various embodiments, the two mechanical interfaces are coaxial and large-diameter, which means that multiple transmission stages can be stacked axially, enabling very large reduction ratios.

Due to the high performance and low cost of transmissions made according to various embodiments disclosed herein, they can be used in various demanding applications, including controlling the swivel of sun-tracking devices (e.g., solar concentrators), swivel turrets of cranes and boom lifts, winches, and even applications such as vehicle drive-trains.

In various embodiments, using the transmission in reverse as an "up ratio" transmission can be useful for transferring power from wind turbines to their generators.

According to aspects of the invention, a disclosed transmission comprises: an outer rigid body having internal traction surface on internal surface thereof; an inner rigid body concentric to the outer rigid body, and having external traction surface on external surface thereof; an intermediate rigid body concentric to the outer rigid body and the inner rigid body; and a flexible element threaded about the intermediate rigid body such that it concurrently contacts a section of the internal traction surface and a section of the external traction surface. The inner and outer bodies may be sprockets, while the intermediate body may be a carrier. The flexible element may be an elastic friction belt, an elastic toothed belt, a timing belt, a piecewise rigid chain, a roller chain a piecewise rigid toothed chain, etc. The carrier may include fixedly attached planetary body, freely rotating idler sprockets, etc.

DESCRIPTION OF THE DRAWINGS

Other aspects and features would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Also, it should be appreciated that for clarity, only the motive elements of the transmission are shown and described. The transmission also requires a bearing system to hold all of the motive elements in place. However, attempting to show the bearing system would obscure and complicate the explanation of the motive elements of the transmission—to which embodiments of the invention are directed. Of course, adding appropriate bearing system to any of the embodiments would be within the realm of those of ordinary skill in the art and any generic bearing system may be adapted to the various embodiments.

Figure 1:
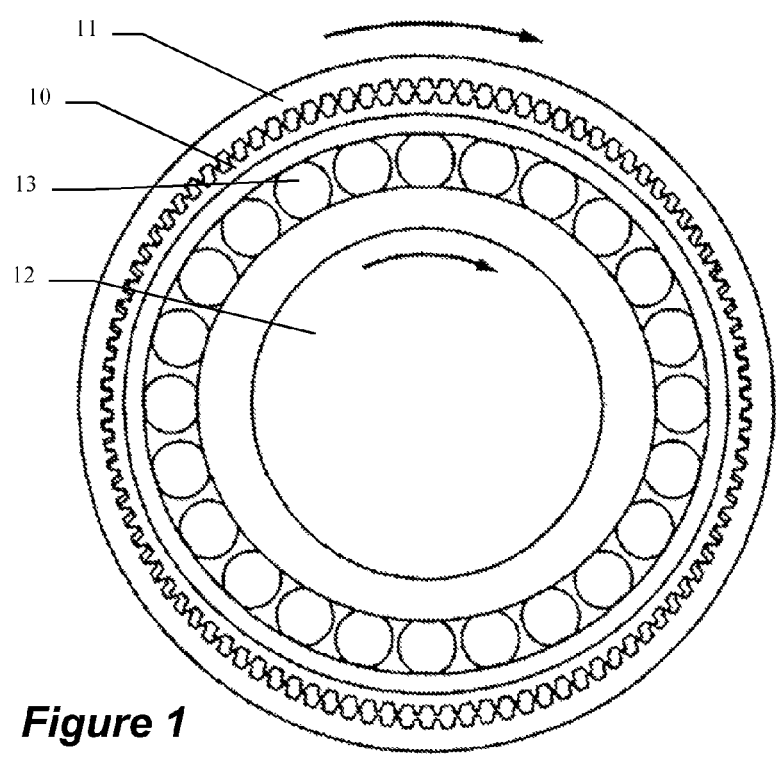

FIG. 1: Prior art—Harmonic transmission

Figure 2:
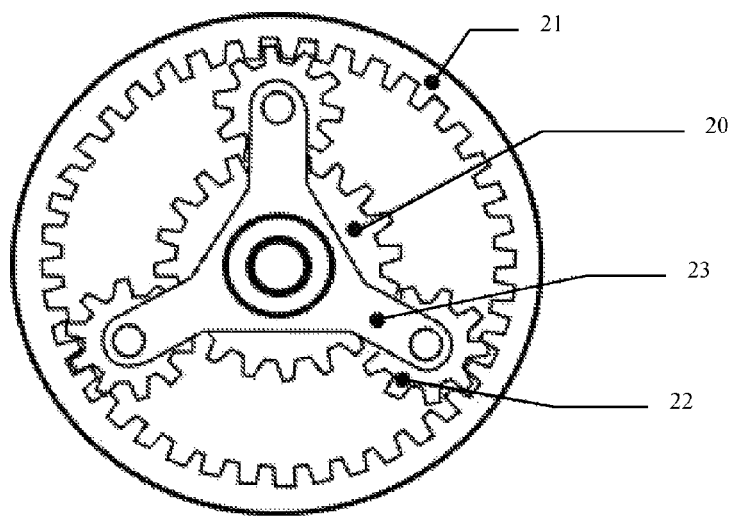

FIG. 2: Prior art—Planetary transmission

Figure 3A:
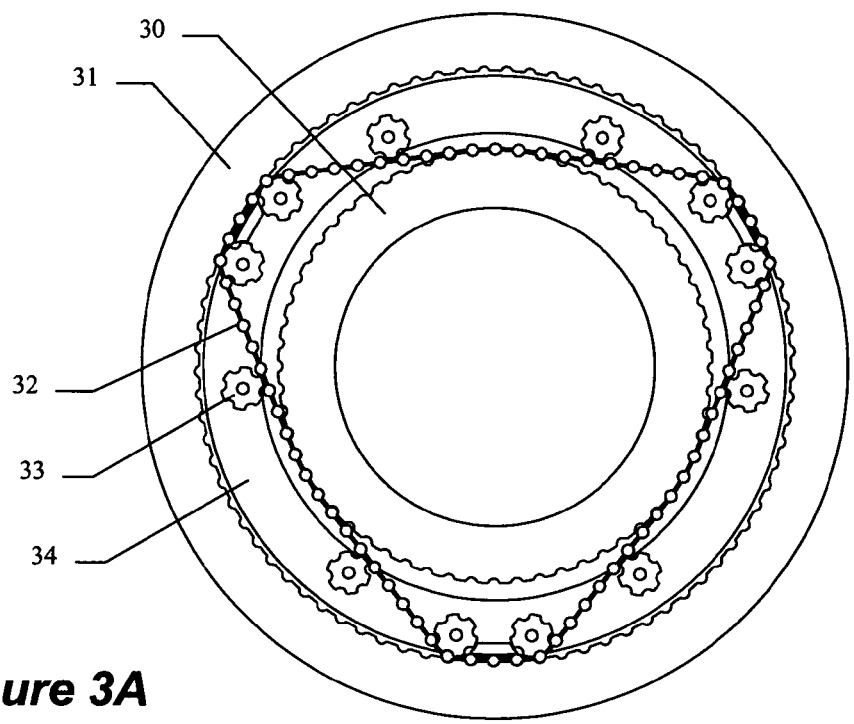
Figure 3B:
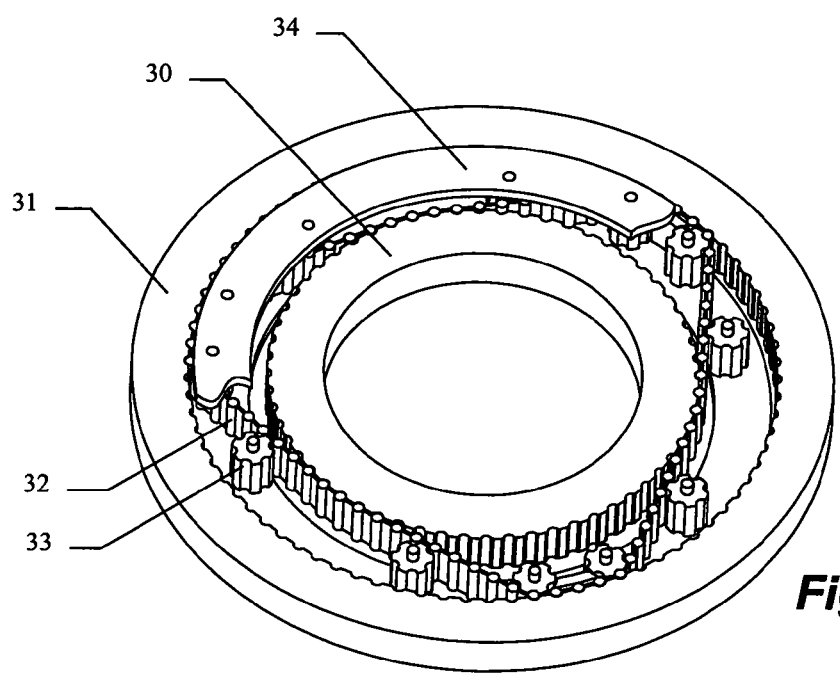

FIGS. 3A and 3B: Embodiment of planetary harmonic differential transmission

Figure 4:
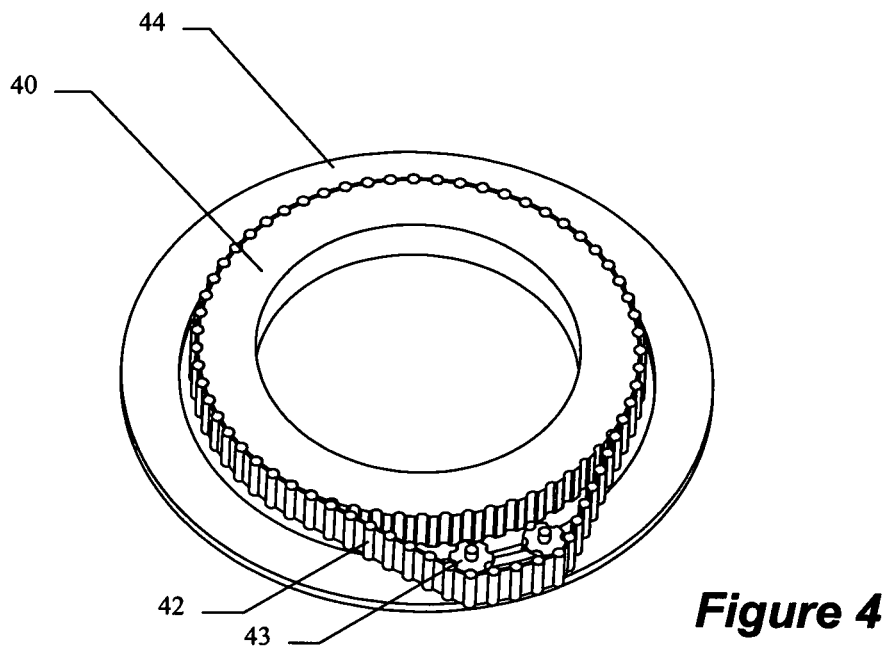

FIG. 4: Embodiment illustrating single harmonic wave

Figure 5:
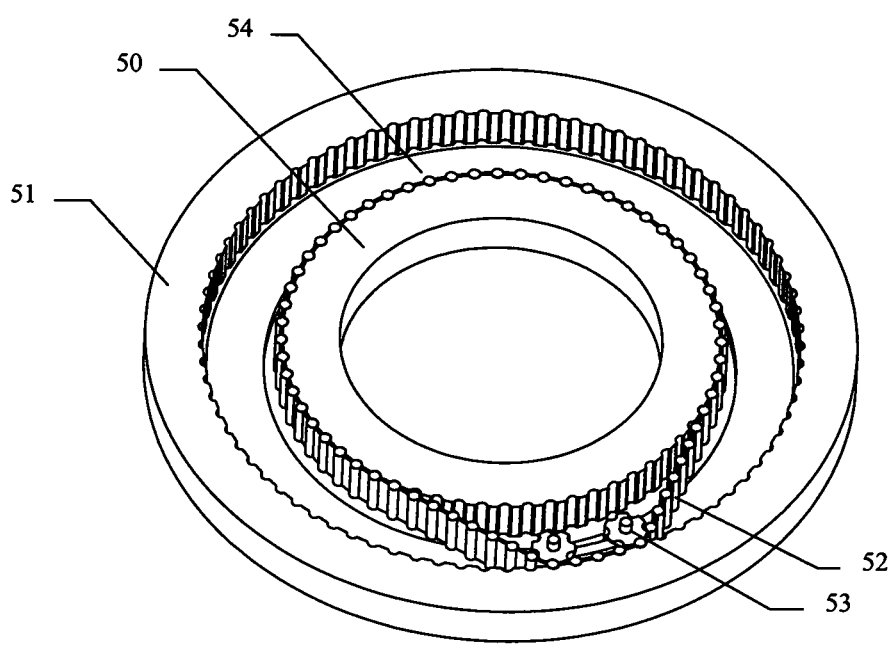

FIG. 5: Embodiment illustrating single harmonic wave with outer sprocket

Figure 6:
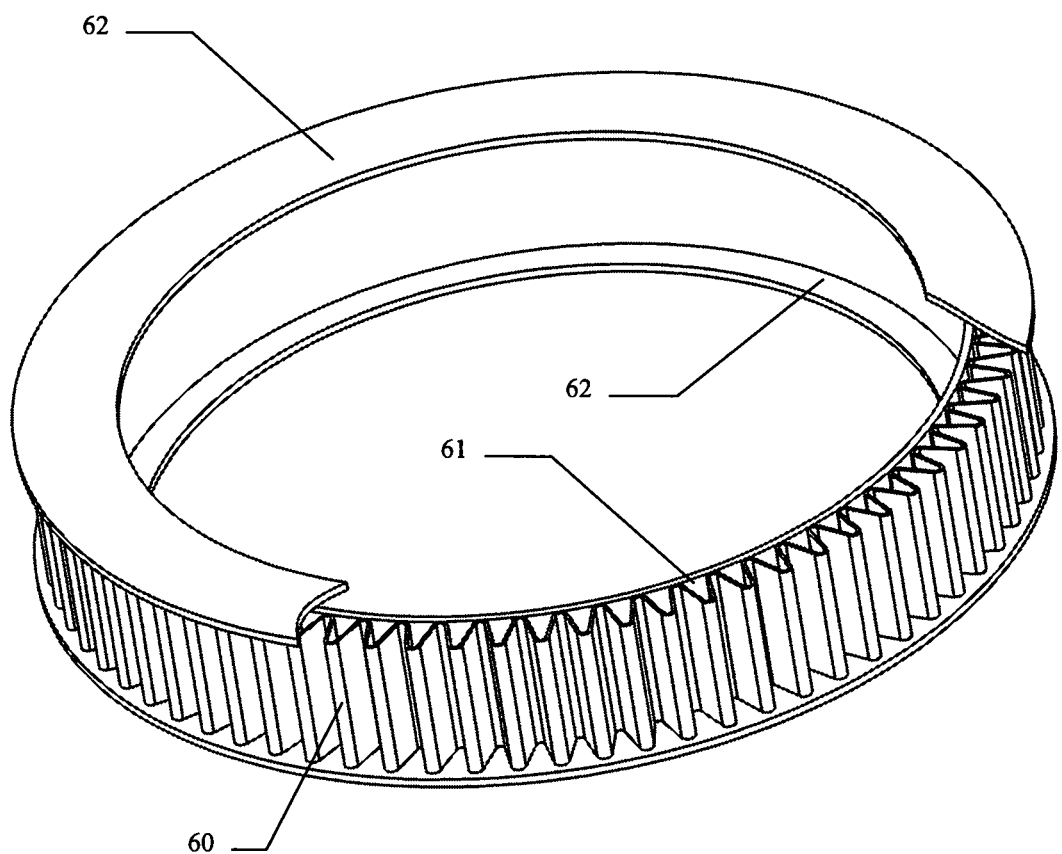

FIG. 6: Embodiment illustrating compound sprocket design

Figures 7A, 7B:
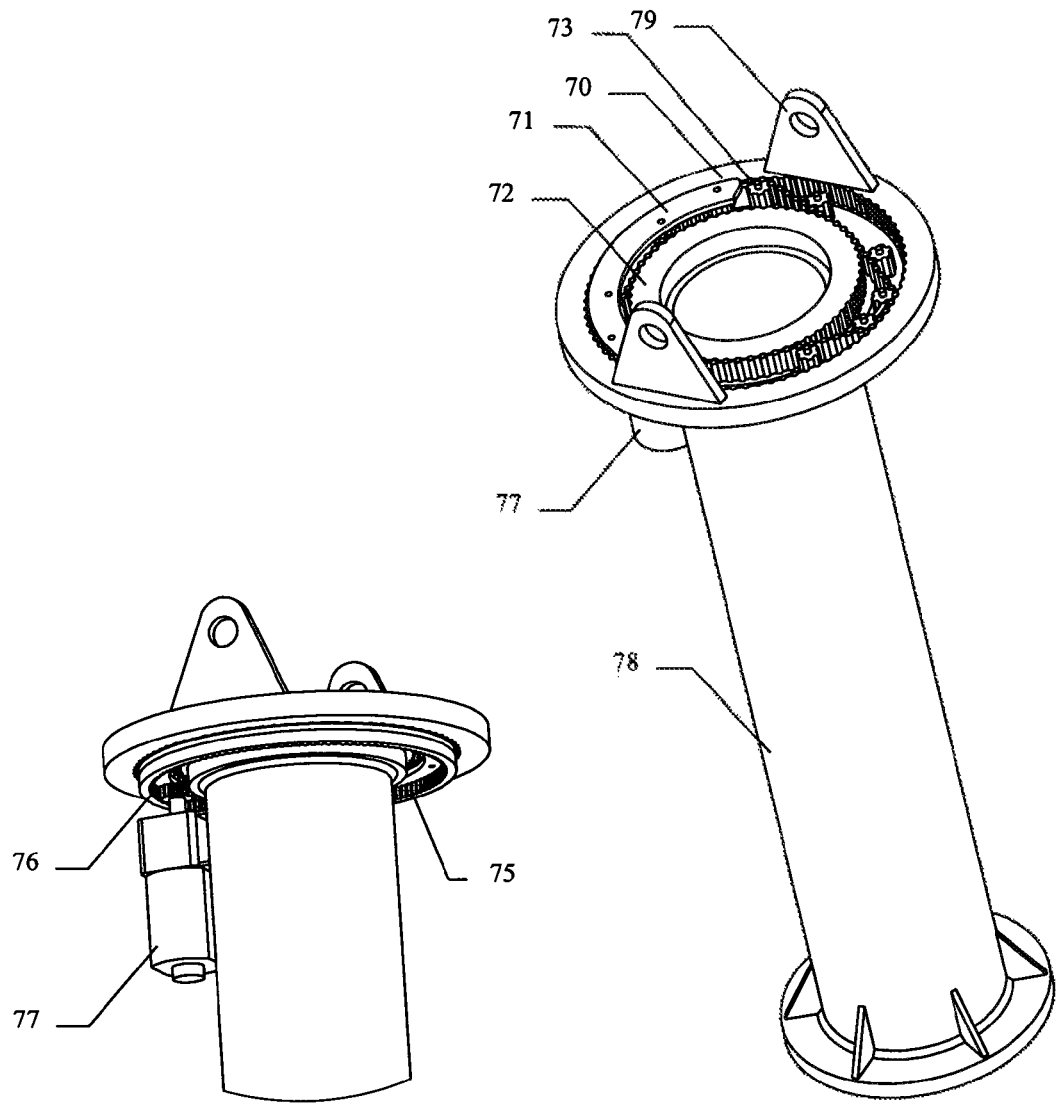

FIGS. 7A and 7B: Embodiment illustrating planetary harmonic differential transmission mounted on a stationary shaft.

Figure 8:
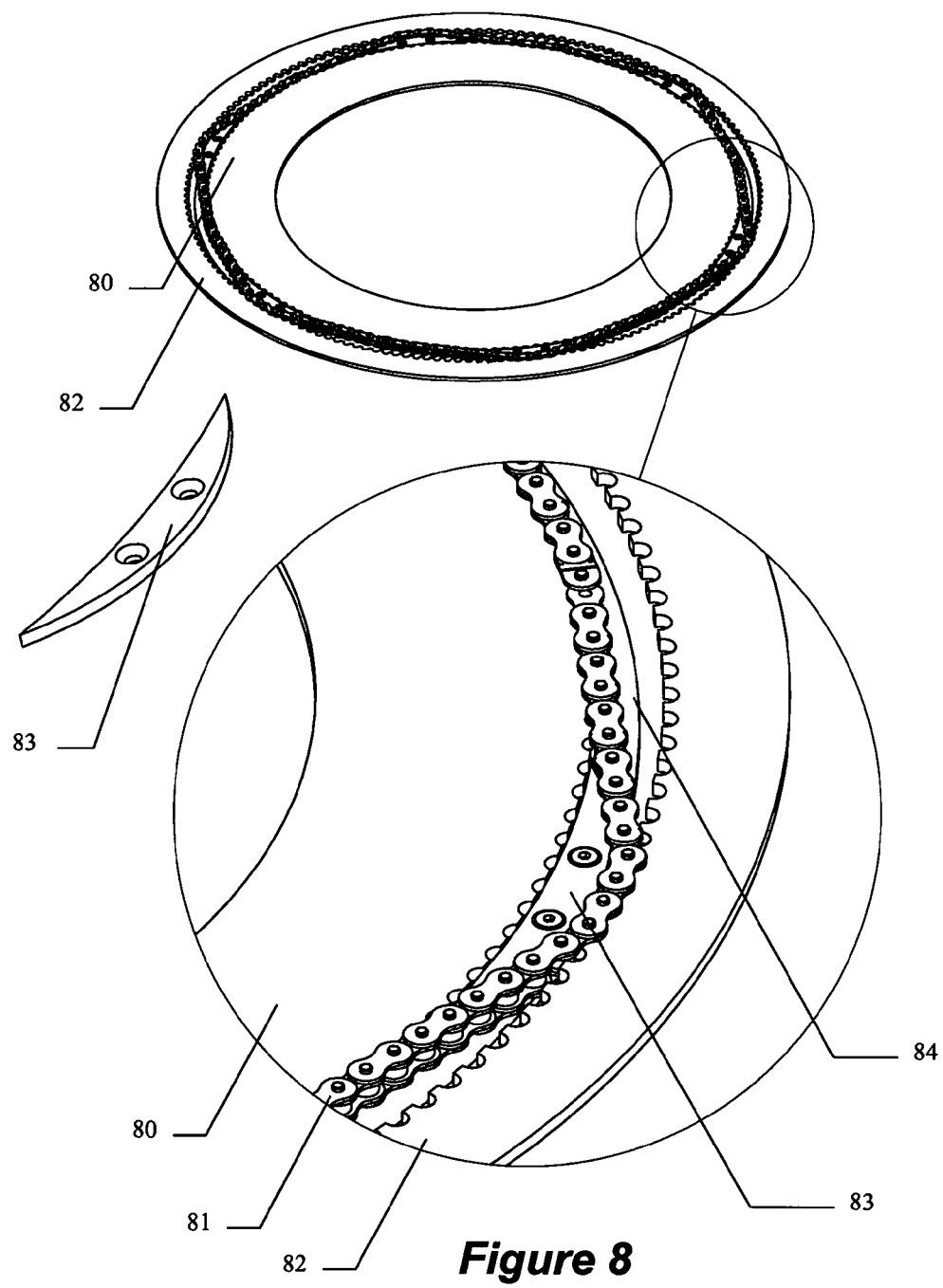

FIG. 8: Embodiment illustrating planetary harmonic differential transmission utilizing chain.

Figure 9:
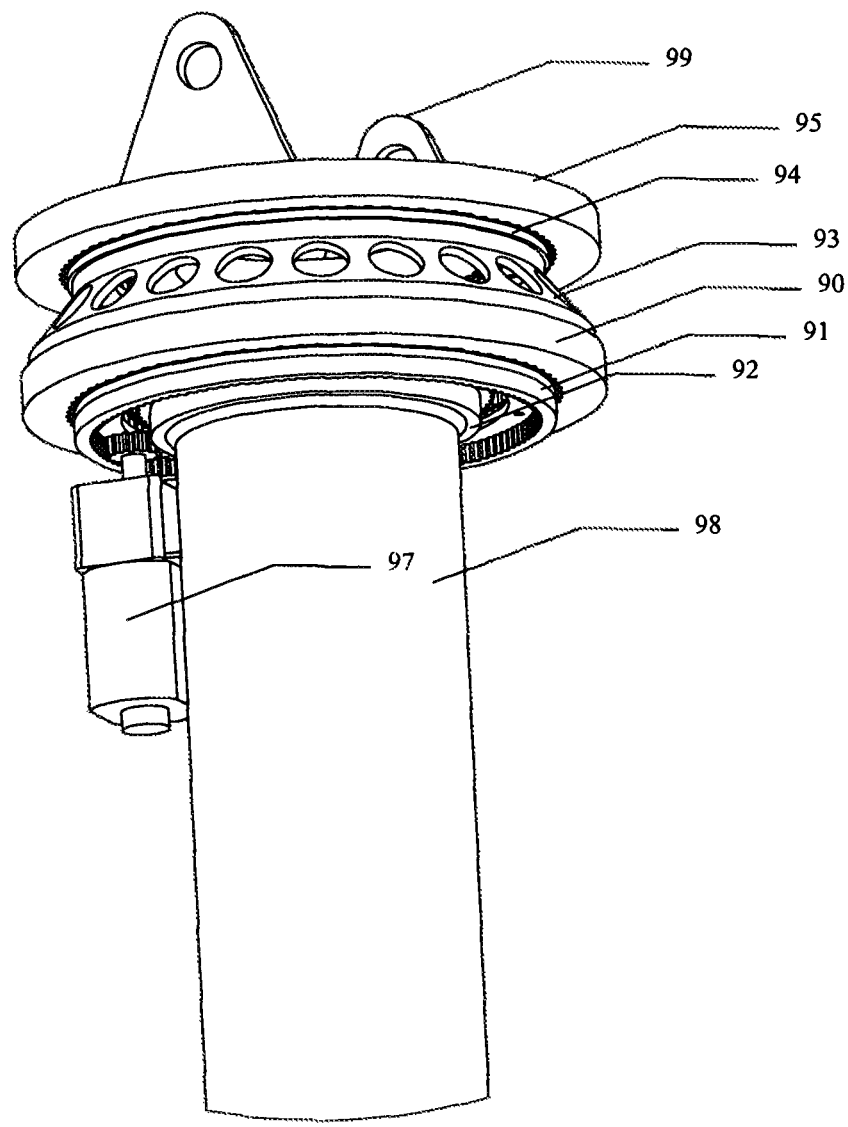

FIG. 9: Embodiment illustrating axially stacked planetary harmonic differential transmission.

DETAILED DESCRIPTION

Various embodiments described herein enable transmissions that have high performance in terms of torque, rigidity and backlash, but they can be produced with lower tolerances and lower costs. The low tolerance requirement is enabled, in part, by the use of sprockets, rather than high precision toothed wheels. This drastically reduces the cost, since the sprockets can be made using techniques such as casting, punched metal, etc., which are of low cost. The transmission couples an inner sprocket and outer sprocket via an intermediate rotating carrier cage using a flexible belt or chain. The torque is transmitted among the sprockets using the belts or chains, which are also articles of low tolerance and low cost. When a belt is used for the torque transfer, it may be a simple belt for relatively low accuracy applications, or a timing belt when the application required higher accuracy or synchronization of motion.

In one of its general forms, embodiments of the invention include a rotary transmission comprising: an inner rotary power transfer means with a first traction means on its external face, an outer rotary power transfer means with a second traction means on its internal face, the external face having a longer circumference than said internal face, a deformable tension element surrounding said inner rotary power transfer means and surrounded by said outer rotary power transfer means and having a third traction means on its internal face and a fourth traction means on its external face, and a rotary deforming power transfer means configured to deform said deformable tension element so as to engage successive portions of first and third traction means to each other, and additionally progressively engage successive portions of second and fourth traction means to each other.

FIGS. 3A and 3B illustrate a first embodiment, in top cross-section and cut-away perspective views, respectively. The transmission couples a rigid externally-toothed inner sprocket [30], a rigid internally-toothed outer sprocket [31], an elastic belt which, in this illustrative example is a two sided timing belt [32] that is toothed on both its internal and external faces, and a set of free-rotating planetary sprockets [33] that are mounted on a common rotating carrier cage [34] and cause the belt to progressively engage and disengage from successive segments of the inner and outer sprockets. In this embodiment, the inner sprocket is assumed stationary, such that the input interface is the relative motion between the carrier cage and the inner sprocket, and the output interface is the motion between the outer sprocket and the inner sprocket. In this embodiment the carrier cage [34] and the outer sprocket [31] rotate in the same direction relative to the inner sprocket [30], except that the outer sprocket [31] rotates slower than the carrier cage [34].

In other embodiments, the timing belt can be replaced with a piecewise rigid chain such as a roller chain, or with a friction belt in which case the sprockets are replaced with friction wheels, all without affecting the basic functionality or relationship between the interfaces. In all of these cases, the interface between the belt or chain and the wheel or sprocket is referred to as the traction surface.

The sprockets can be made out of aluminum for example, and work with standard timing belts, without a need of lubrication. Timing belts are backlash free, since they distribute the load along several elastic teeth.

Just like in a harmonic drive, as the carrier cage rotates, it deforms the belt, inducing a cyclical wave motion in it, and the wave travels over both inner and outer sprockets [30] and [31], engaging and disengaging from successive regions of them. It is the different in the number of teeth between the inner and outer sprockets [30] and [31] that adds harmonic amplification to this process and causes the outer sprocket [31] to rotate in relation to the inner sprocket [30], without requiring any of them to be deformable.

Unlike an elastic harmonic transmission, however, the deformable element in this transmission remains completely internal to the mechanism and does not carry torque to any external shaft, making its design much simpler. Note that in the conventional harmonic transmission, such as the one exemplified in FIG. 1, the flexible element is connected to the input or output shafts, i.e., external shafts, such that it has to transmit the torque to the external shaft. On the other hand, in the embodiment of FIGS. 3A and 3B, the flexible element, i.e., the belt or chain, is not connected to any external shaft and does not need to transfer torque to an external shaft. Rather, the flexible element is internal to the transmission and transfer torque to rigid sprockets. The rigid sprockets then transfer the torque to the external shaft.

Compared directly to the harmonic transmission shown in Other aspects and features would be apparent from the detailed description, which would be made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Also, it should be appreciated that for clarity, only the motive elements of the transmission are shown and described. The transmission also requires a bearing system to hold all of the motive elements in place. However, attempting to show the bearing system would obscure and complicate the explanation of the motive elements of the transmission—to which embodiments of the invention are directed. Of course, adding appropriate bearing system to any of the embodiments would be within the realm of those of ordinary skill in the art and any generic bearing system may be adapted to the various embodiments.

FIG. 1, the carrier cage can correspond to the elliptical wave generator, and the belt to the flexible inner gear, except that in the transmission of FIGS. 3A-B, the belt works only in tension and does not communicate with the outside world but rather with the inner sprocket, so there are no flexible torque carrying elements. Conversely, like in a planetary transmission, all the torque carrying members (inner sprocket, outer sprocket, and carrier cage) are fully rigid, and the planetary sprockets free-rotate (i.e., serve as idlers).

Unlike a planetary drive, however, there is no hard gear-to-gear contact in this transmission, since every rigid component only touches the belt. For this reason, manufacturing of this transmission is a lot easier in terms of geometric and surface quality tolerances, and additionally all wear occurs exclusively on the belt, which is easily and cheaply replaceable. That is, since the flexible element is not connected to any of the external drive shafts, it is easily replaceable. Furthermore, since there is no hard gear-to-gear contact, there is no risk of metal grinding and the consequential particulate contamination that may propagate the damage around the transmission. All the engagements occur over several teeth between the belt and sprockets, and so the load is not concentrated.

While the embodiment of FIGS. 3A-3B shows the belt as having three lobes and having a roughly triangular shape, any number of lobes is possible, and the belt does not have to follow a simple convex contour. For example, a more convoluted serpentine belt path will increase the total contact area that the belt makes with the sprockets. A larger number of lobes will reduce the amount of tension that is experienced by the belt.

The operation of the transmission can be further understood with respect to a simplified embodiment as follows. The following embodiment employs a belt having a single lobe. FIG. 4 shows an inner sprocket [40] with an elastic belt [42], a driving carrier cage [44] and planetary sprockets [43]. As the carrier cage is rotated, the wave in the belt advances around the inner sprocket, and the belt itself advances only a small number of teeth for every revolution of the carrier cage, the size of the advance equal to the difference between the circumference of the belt and the circumference of the inner sprocket.

FIG. 5 shows the same arrangement as FIG. 4, but with an outer sprocket [51] that also contacts the wave in the belt. With every revolution of the carrier cage [54], the belt [52] will advance only a small number of teeth relative to the outer sprocket as well, the size of the advance equal to the difference between the circumference of the belt and the circumference of the outer sprocket. Thus, rotation of the carrier cage induces a relative rotary motion between the outer and the inner sprockets.

If we denote the perimeter (circumference) of the inner sprocket as i, the inner perimeter (circumference) of the outer sprocket as o, and the perimeter of the belt as b, we can establish the following relations:

If the carrier cage rotates so that the planets (idlers) travel a complete trip around the belt, the carrier cage will have made b/i revolutions relative to the inner sprocket, and b/o revolutions relative to the outer sprocket. The outer sprocket will have thus made b/i–b/o revolutions relative to the inner sprocket.

Assuming the inner sprocket is fixed, the motor drive is between the inner sprocket and the carrier cage, and the output drive is between the inner sprocket and the outer sprocket, the transmission ratio is (b/i)/(b/i–b/o)=o/(o–i), and the length of the belt cancels out. Thus if the sprockets are of similar size, for example i=100, b=105, o=110, then the transmission ratio in this configuration is 11:1.

A different way to explain the operation of the transmission is to consider it from the point of view of the carrier cage. In this case, the belt acts as a simple power transmission belt between the outer and inner sprockets (albeit attached to the inner face of the outer sprocket) but is also constrained by the idler sprockets on the carrier cage, which allow the carrier cage to now be attached to the ground. This same point-of-view transformation can also be applied to regular harmonic gear such as shown in Other aspects and features would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Also, it should be appreciated that for clarity, only the motive elements of the transmission are shown and described. The transmission also requires a bearing system to hold all of the motive elements in place. However, attempting to show the bearing system would obscure and complicate the explanation of the motive elements of the transmission—to which embodiments of the invention are directed. Of course, adding appropriate bearing system to any of the embodiments would be within the realm of those of ordinary skill in the art and any generic bearing system may be adapted to the various embodiments.

FIG. 1—from the central body's point of view, the flexible sprocket is only "crawling" around it, with no wave motion.

For a down-ratio application such as slowly turning the power house at the top of a wind turbine or a solar dish about their vertical poles, the inner sprocket will be mounted rigidly to the perimeter of the vertical pole, the outer sprocket will be mounted rigidly to the swiveling part (the power house or the solar dish yoke) and the driving motor will be connected between the vertical pole and the cage. An example of such an application is illustrated in FIGS. 7A and 7B. Vertical pole 78 is stationary and is attached, for example, to the ground. The inner sprocket 72 is fixedly attached to the vertical pole 78. A driving motor 77 is attached to the pole 78 and engages the carrier 71. In this example, a small gear 76 is mounted to the rotating shaft of the driving motor 77 and engages teeth 75 formed on the inner circumference of the carrier. When the motor 77 is energized, the carrier 71 rotates about the inner sprocket 72. A flexible element, in this case a timing belt having teeth on both sides, engages the teeth of the inner sprocket 72 and the idlers 73 of the carrier 71. The belt also engages teeth on the out sprocket 70, thereby transferring rotation motion to the outer sprocket. In this example, the outer sprocket 70 rotates in the same direction as the carrier 71, but at a reduced speed. Thus, any asset attached to the outer sprocket 70, e.g., a solar concentrator dish, parabolic antenna dish, etc., attached to brackets 79, can be rotated using motor 77, thereby accurately positioning the asset.

On the other hand, for an up-ratio power transmission, like the one connecting the relatively slow main shaft of a wind turbine to a faster spinning electrical generator located in the power house, the outer sprocket will be connected to the stationary power house frame, the inner sprocket will be connected to the turbine main shaft, and the faster moving carrier cage will be connected to the electrical generator residing inside the power house.

Sprockets, timing belts, roller chains, friction wheels and smooth flexible belts are all standard engineering components and are available in a wide variety of sizes and materials.

FIG. 6 shows an example of a compound sprocket designed for low cost manufacturing of especially large diameter or large width sprockets. The design is suitable for both timing belts and roller chains, and for both internal and external traction surfaces.

The traction surface [60] is made from a bent strip of sheet metal, which is pre-formed to the correct profile to match the belt or chain. The strip is connected to a tubular segment [61] which gives it rigidity and an accurate circular shape. Two sheet metal flanges [62] provide additional rigidity, act as belt guides, and provide an interface to transfer torque in or out of the sprocket. The flexibility offered by the sheet metal traction strip allows for stress distribution between the belt or chain and the sprocket across multiple teeth. In an internal sprocket, the traction strip will be place inside the tube section 61.

FIG. 8 illustrates another embodiment which can be used for simple, accurate and/or synchronized rotation. In this embodiment, the elastic double sided timing belt is replaced by a roller link chain 81, similar to the one used in bicycles or other power transmissions. The inner and outer sprockets 80 and 82, respectively, are similar to the ones used with the timing belt, but their tooth profile matches the rollers of the chain links. The planetary sprockets are replaced with moon-shaped planetary body 83 that are fixedly attached to the carrier 84 and do not rotate, since the chain 81 already contains rollers in each of its joints and so can glide smoothly over them.

Since all the rotary power interfaces to the transmission are concentric, it is possible to stack several such transmissions coaxially to achieve higher transmission ratios. FIG. 9 illustrate an embodiment of such a transmission, referred to as axially stacked planetary harmonic differential transmission. In FIG. 9, pole 98 is stationary—similar to that of FIGS. 7A-7B. The motor 97 drives the carrier 91 of a first transmission. The inner sprocket 92 of the first transmission is fixedly attached to the pole 98. a belt or chain is threaded as in any of the above described embodiments, such that it engages the outer sprocket 90. An adapter 93 is fixedly attached to the outer sprocket 90 and the carrier 94 of a second transmission that is axially stacked with the first transmission. The inner sprocket (not visible) of the second transmission is also fixedly attached to the pole 98. A second belt or chain is threaded as shown in any of the above embodiment, so as to engage the outer sprocket 95, of the second transmission. The asset is attached to the brackets 99 and is rotated at a reduction ratio that is a product of the reduction ratios of the two transmissions. As can be understood, the number of axially stacked planetary harmonic differential transmission can be chosen according to the specific performance requirements of the drive system.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

The present invention has been described in relation to particular examples, which are intended in all respects to be illustrative rather than restrictive. Those skilled in the art will appreciate that many different combinations of hardware will be suitable for practicing the present invention. Moreover, other implementations of the invention will be apparent to those skilled in the art from consideration of the specification and practice of the invention disclosed herein.

What is claimed is:

1. A rotary transmission comprising:
    an inner rotary power transfer means with a first traction means on its external face,
    an outer rotary power transfer means with a second traction means on its internal face, said internal face having a longer circumference than said external face,
    a deformable tension element surrounding said inner rotary power transfer means and surrounded by said outer rotary power transfer means and having a third traction means on its internal face and a fourth traction means on its external face, and a rotary deforming power transfer means configured to deform said deformable tension element, wherein said rotary deforming power transfer means comprises a plurality of free-rotating planetary sprockets mounted on a common rotating carrier so as to engage successive portions of first and third traction means to each other, and additionally progressively engage successive portions of second and fourth traction means to each other.

2. The transmission of claim 1, configured so that rotation of said rotary deforming power transfer means relative to said inner power transfer means causes rotary motion between said outer rotary power transfer means and said inner rotary power transfer means.

3. The transmission of claim 1, configured so that rotation of said inner power transfer means relative to said outer power transfer means causes rotary motion between said rotary deforming power transfer means and said outer rotary power transfer means.

4. The transmission of claim 1, where at least one of said inner and other rotary power transfer means is round.

5. The transmission of claim 1, where at least one of said inner and outer rotary power transfer means is a sprocket.

6. The transmission of claim 1, where said deformable tension element is a closed loop.

7. The transmission of claim 1, where said deformable tension element is one of an elastic friction belt, an elastic toothed belt, a timing belt, a piecewise rigid chain, a roller chain or a piecewise rigid toothed chain.

8. The transmission of claim 1, where said deformable tension element is a toothed elastic belt with teeth made out of a material belonging to the group consisting of rubber, Neoprene, Polyurethane, Urethane, and synthetic polymer.

9. The transmission of claim 1, where said rotating carrier is configured to rotate in same direction as the inner rotary power transfer means.

10. The transmission of claim 1, wherein said deformable tension element is an elastic belt and wherein said third traction means on its internal face and a fourth traction means on its external face comprise teeth on its internal face and teeth on its external face.

11. A rotary transmission comprised of:
a first round rotary power transfer means having a first axis of rotation and a first traction surface,
a second round rotary power transfer means having a second axis of rotation and a second traction surface,
a deformable tension element having internal traction surface and external traction surface, wherein the deformable tension element follows a simple convex contour, and
a deforming rotary power transfer means having a third axis of rotation, such that a portion of said first traction surface contacts a portion of the internal traction surface of said deformable tension element, and a portion of said second traction surface contacts a portion of the external traction surface of said deformable tension element, and a portion of said deforming rotary power means contacts said deformable tension element, and all three axes of rotation are parallel, and all three axes of rotation lie within the perimeters of both round rotary power transfer means.

12. A transmission comprising:
an outer rigid body having internal traction surface on internal surface thereof;
an inner rigid body concentric to the outer rigid body, and having external traction surface on external surface thereof;
an intermediate rigid body concentric to the outer rigid body and the inner rigid body, and rotating about an axis concentric to the outer rigid body;
at least one free-rotating idler mounted on the intermediate rigid body; and,
a flexible element having inner surface and outer surface and threaded about and contacting the idler on the intermediate rigid body such that the flexible element also concurrently contacts by its outer surface a section of the internal traction surface and by its inner surface a section of the external traction surface; such that when the intermediate rigid body rotates revolutions relative to the inner rigid body, the idler travels around the flexible element.

13. The transmission of claim 12, wherein at least one of the outer rigid body and the inner rigid body is a sprocket.

14. The transmission of claim 12, wherein the intermediate rigid body comprises a rotating planetary body and the idler comprises a sprocket mounted on the planetary body.

15. The transmission of claim 14, wherein the planetary body comprises teeth formed to engage a driving motor.

16. The transmission of claim 14, wherein a plurality of freely rotating idlers are mounted onto the planetary body, and the flexible element comprises a belt engaging the plurality of freely rotating idlers.

17. The transmission of claim 16, wherein the belt is a double-sided toothed belt having teeth on both of its engaging surfaces.

18. The transmission of claim 12, wherein one of the outer rigid body, inner rigid body or intermediate rigid body is fixedly anchored, while the remaining two rotate.

19. The transmission of claim 12, wherein the flexible element transfers torque between the intermediate rigid body and the outer rigid.

20. The transmission of claim 12, configured so that rotation of said intermediate rigid body relative to said inner rigid body causes rotary motion between said outer rigid body and said inner rigid body.

21. The transmission of claim 12, configured so that rotation of said inner rigid body relative to said rigid body causes rotary motion between said intermediate rigid body and said outer rigid body.

* * * * *